(12) United States Patent
Shumway

(10) Patent No.: US 7,207,781 B2
(45) Date of Patent: Apr. 24, 2007

(54) PRESSURE EXCHANGE APPARATUS WITH DYNAMIC SEALING MECHANISM

(76) Inventor: Scott Shumway, 764 Leavensworth Rd., Hinesburg, VT (US) 05461

(*) Notice: Subject to any disclaimer, the term of this patent is extended or adjusted under 35 U.S.C. 154(b) by 368 days.

(21) Appl. No.: 10/921,636

(22) Filed: Aug. 20, 2004

(65) Prior Publication Data

US 2006/0037907 A1 Feb. 23, 2006

(51) Int. Cl.
*F04F 11/00* (2006.01)
*F01B 23/08* (2006.01)
*F04B 17/00* (2006.01)
*B01D 61/00* (2006.01)

(52) U.S. Cl. ............. 417/67; 210/416.1; 210/321.65; 210/321.66; 417/321; 417/326; 417/65; 417/66; 417/64; 415/115; 415/116

(58) Field of Classification Search ............ None
See application file for complete search history.

(56) References Cited

U.S. PATENT DOCUMENTS

| 4,468,176 | A | * | 8/1984 | Munch ................. 417/406 |
| 4,471,795 | A | * | 9/1984 | Linhardt ................ 137/14 |
| 4,973,402 | A | * | 11/1990 | Johnson et al. ......... 210/136 |
| 5,049,045 | A | * | 9/1991 | Oklejas et al. .......... 417/365 |
| 6,537,035 | B2 | * | 3/2003 | Shumway ............... 417/64 |
| 6,773,226 | B2 | * | 8/2004 | Al-Hawaj .............. 415/116 |

* cited by examiner

*Primary Examiner*—Krishnan S. Menon
(74) *Attorney, Agent, or Firm*—Eric C. Spencer

(57) ABSTRACT

A pressure exchange device is provided that utilizes a rotor assembly inside a housing to transfer the pressure of a fluid from one high pressure fluid to another low pressure fluid. The housing may comprise a pressurized fluid contained therein to provide a sealing force to reduce fluid leakage between the spinning rotors and the housing. The sealing force and wear characteristics may be controlled to reduce leakage and wear of the pressure exchange device. The rotor assembly may be driven in either direction and the high pressure ports may be switched with the low pressure ports if desired.

23 Claims, 3 Drawing Sheets

PRESSURE EXCHANGE APPARATUS WITH DYNAMIC SEALING MECHANISM

BACKGROUND OF THE INVENTION

This invention relates to pressure exchangers for transfer of energy from one liquid flow to another. More specifically, this invention relates to pressure exchangers for the transfer of energy from one liquid stream to another using a rotating split rotor exhibiting enhanced/proportional sealing and wear adjustment characteristics.

The present invention provides a device which can be appropriately described as an engine for exchanging pressure energy between relatively high and relatively low pressure fluid systems, which the term fluid being defined here as including gases, liquids and pumpable mixtures of liquids and solids. The engine for pressure energy exchange of the present invention is a highly efficient device with well over 90% of the energy of pressurization in a pressurized fluid system being transferred to a fluid system at a lower pressure. The device employed for achieving this highly efficient transfer has a long and trouble free operating life which is not interrupted by the plugging and fouling of valves, or the binding or freezing of sliding pistons or the like.

In processes where a liquid is made to flow under pressure, only a relatively small amount (about 20%) of the total energy input is consumed in pressurizing the liquid, the bulk of the energy being used instead to maintain the fluid in flow under pressure. For this reason, continuous flow operation requires much greater energy consumption than non-flow pressurization.

In some industrial processes, elevated pressures are required only in certain parts of the operation to achieve the desired results, following which the pressurized fluid is depressurized. In other processes, some fluids used in the process are available at high pressures and others at low pressures, and it is desirable to exchange pressure energy between these two fluids. As a result, in some applications, great improvement in economy can be realized if pressure exchange can be efficiently transferred between two.

By way of illustration, a specific process of this type is the exchange crystallization process for effecting desalination of sea water, or other saline aqueous solutions. In this process, a slurry of ice and an exchange liquid, such as a hydrocarbon, is placed under extreme pressure in order to reverse the order of freezing so that the ice crystals melt, and the exchange liquid is partially frozen. Following this step of the desalination process, the water from the melting of the ice is separated from the hydrocarbon, which is in the form of a slurry of solid hydrocarbon particles with the liquid hydrocarbon, and the separated phases are then depressurized to near atmospheric pressure. The economy with which the exchange crystallization desalination process can be practiced is directly dependent upon the efficiency with which the energy input to the process upon pressurization of the ice-exchange liquid system can be recovered after separation of the water-exchange liquid phases.

Another example where a pressure exchange engine finds application is in the production of potable water using the reverse osmosis membrane process. In this process, a feed saline solution is pumped into a membrane array at high pressure. The input saline solution is then divided by the membrane array into super saline solution (brine) at high pressure and potable water at low pressure. While the high pressure brine is no longer useful in this process as a fluid, the pressure energy that it contains has high value. A pressure exchange engine is employed to recover the pressure energy in the brine and transfer it to feed saline solution. After transfer of the pressure energy in the brine flow, the brine is expelled at low pressure to drain.

Accordingly, pressure exchangers of varying design are well known in the art. U.S. Pat. No. 3,431,747 to Hashemi et al. teaches a pressure exchanger for transfer of pressure energy from a liquid flow of one liquid system to a liquid flow of another liquid system. This pressure exchanger comprises a housing with an inlet and outlet duct for each liquid flow, and a cylindrical rotor arranged in the housing and adapted to rotate about its longitudinal axis. The cylindrical rotor is provided with a number of passages or bores extending parallel to the longitudinal axis and having an opening at each end.

A separation device may be inserted into each bore for separation of the liquid systems. The movement of the separation device is limited due to the use of a seat at each end of the passages. The seats cause a reduction in cross-area of the bores and are susceptible to wear and eventual failure.

Referring to FIG. 3 which shows a cross-section of the prior art exchanger, a major drawback of the prior art is the reduction in sealing surface-area between the inlet and outlet ports. The two ducts are separated by a very thin wall, thereby requiring extremely tight fitting components to ensure an acceptable level of sealing and the prevention of pressure loss between the high and low pressure ports. Leakage between these two ports results in reduced efficiency of the pressure exchanger, and as the tight tolerances of the mechanical components begin to wear, leakage between the ports will only increase and require costly maintenance as shown in FIG. 3. Attempts have been made to incorporate springs and seals at the ends of the passageways to reduce leakage. Due however to the obvious drawbacks of this approach, the seals eventually wear out and or the springs degrade overtime, both of which require expensive downtime and repair. In addition, seals of this nature function properly only when they are aligned with the housing bores. During a single rotation, alignment of the rotor bore and the housing bore occurs only for a brief moment during the cycle. A seal with intermittent sealing capability is undesirable since leakage of high pressure fluid to the low pressure conduit represents a reduction in efficiency of the device.

There therefore is a need for a pressure exchanger which provides both smooth and uninterrupted fluid exchange as well as enhanced sealing capability thereby reducing the amount of leakage that occurs between the high and low pressure ports.

SUMMARY OF THE INVENTION

In accordance with a general aspect of the present invention, a pressure exchange apparatus for the transfer of a fluid is provided which consists of a housing having a low pressure inlet located at a first distal end of a housing and a low pressure outlet located at a second distal end of the housing. The low pressure outlet is in alignment with the low pressure inlet, and the housing also has a high pressure inlet located at the second distal end of and a high pressure outlet located at the first distal end of the housing. The high pressure inlet is in alignment with the high pressure outlet.

A left rotor is rotatably mounted inside the housing, with the left rotor having a first low pressure conduit and a first high pressure conduit running therethrough, both conduits are configured to align with the high pressure outlet and the low pressure inlet concurrently as the left rotor rotates. A right rotor, coaxially aligned with and offset from the left rotor is rotatably mounted inside the housing. The right rotor has a second low pressure conduit and a second high pressure conduit running therethrough, and both conduits are configured to align with the high pressure inlet and the low pressure outlet concurrently as the right rotor rotates.

A first tube is sealingly placed intermediate the left rotor and the right rotor is configured to communicate fluid between the first low pressure conduit and the second low pressure conduit. A second tube is sealingly placed intermediate the left rotor and the right rotor and is configured to communicate fluid between the first high pressure conduit and the second high pressure conduit. A spring disposed between the left rotor and right rotor is configured to bias the rotors apart thereby maintaining light contact with said housing. A motive force is provided to rotate the left and right rotor. A pressurized fluid is provided inside the housing to maintain sealing contact between the left and right rotor and the housing.

In accordance with another aspect of the invention, a system for the filtration of contaminated water to produce potable water is provided which has a low pressure pump configured to pump the contaminated water to a high pressure pump. A high pressure pump is provided to receive contaminated water from the low pressure pump and communicate the contaminated water to a filtration device at an elevated pressure. The filtration device is configured to produce potable water and waste water, with the waste water being expelled at an elevated pressure.

A pressure exchange pump is further provided to receive the waste water from the filtration device and contaminated water from the low pressure pump. The pressure exchange pump has a housing having a low pressure inlet located at a first distal end of the housing and a low pressure outlet located at a second distal end of the housing. The low pressure outlet is in alignment with the low pressure inlet, and the housing also has a high pressure inlet located at the second distal end of and a high pressure outlet located at the first distal end of the housing. The high pressure inlet is in alignment with the high pressure outlet. A left rotor is rotatably mounted inside the housing, with the left rotor having a first low pressure conduit and a first high pressure conduit running therethrough, both conduits are configured to align with the high pressure outlet and the low pressure inlet concurrently as the left rotor rotates. A right rotor, coaxially aligned with and offset from the left rotor is rotatably mounted inside the housing. The right rotor has a second low pressure conduit and a second high pressure conduit running therethrough, and both conduits are configured to align with the high pressure inlet and the low pressure outlet concurrently as the right rotor rotates.

A first tube is sealingly placed approximately intermediate the left rotor and the right rotor and is configured to communicate fluid between the first low pressure conduit and the second low pressure conduit. A second tube is sealingly placed intermediate the left rotor and the right rotor and is configured to communicate fluid between the first high pressure conduit and the second high pressure conduit. A spring disposed between the left rotor and right rotor is configured to bias the rotors apart thereby maintaining light contact with said housing. A motive force is provided to rotate the left and right rotor. A pressurized fluid is provided inside the housing to maintain sealing contact between the left and right rotor and the housing. This fluid acts on both the left and right sealing surfaces so as to exert a net force on said surfaces in proportion to the pressurized fluid pressure. The control of this pressure can be internal to the mechanism or external depending on system requirements. A controlled method requires an external valve and a feedback method such as a pressure gage.

In a further aspect of the invention, a pressure exchange apparatus for transferring the energy of pressurization between two fluids is provided, wherein one fluid is at a relatively higher pressure than the other. A first rotatably mounted rotor having a pair of spaced apart planar end faces, having at least one bore extending axially therethrough with each of the bores having an opening at each end thereof with the openings located in the planar end faces. A second rotatably mounted rotor being spaced apart from and coaxially aligned with the first rotor, the second rotor having a pair of spaced apart planar end faces, having at least one bore extending axially therethrough with each of the bores having an opening at each end thereof with the openings located in the planar end faces. A pair of closure plates rigidly affixed in close proximity to a respective end face of the first rotor and the second rotor. The closure plates slidingly and sealingly engaging the respective end face, and each of the closure plate having at least one fluid inlet passageway and at least one fluid discharge passageway, the passageways being positioned so that a fluid inlet passageway in one of the closure plates is aligned with the bore in the rotors at such time during the rotation of the rotors as a fluid discharge passageway in the other closure plates is aligned with the same bore. A pair of tubes slidably inserted axially between the first and second rotor is held in fluid communication with the bores such that fluid flows from a respective bore of the first rotor to a respective bore of the second rotor. A spring is inserted between the first and second rotor which is configured to bias the first rotor apart from the second rotor. A pressurized fluid acting is provided which acts upon a face of the first rotor and the second rotor to increase the sealing contact between the closure plates and the first and second rotors. The bore openings and passageways being positioned in their respective surfaces so that during rotation of the rotors, the openings at the end of each bore are, in alternating sequence, brought into concurrent alignment with an inlet passageway at one end of the respective bore and a discharge passageway at the other end of the respective bore, and then, at a different time, into concurrent alignment with a discharge passageway at one end of the respective bore and an inlet passageway opening at the other end of the respective bore. A motive force for cyclically rotating the rotors relative to the closure plate so that each of the bore openings periodically moves through the same path to repeatedly effect the alternating sequence of alignment of the bores with the passageways.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 2:
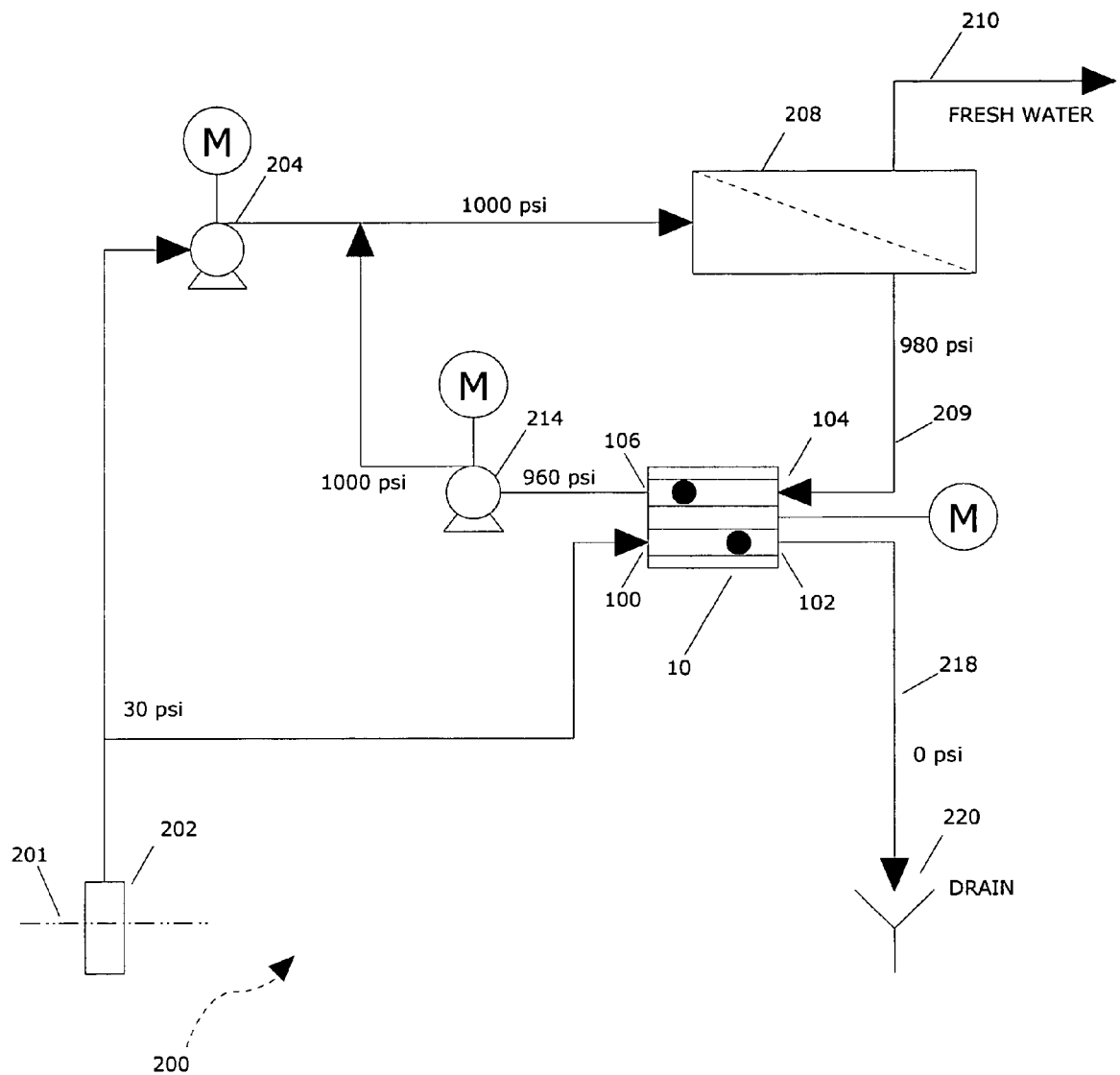
FIG. 2 is a simplified block diagram of a filtration system utilizing the pressure exchange device in accordance with the present invention.
Figure 3:
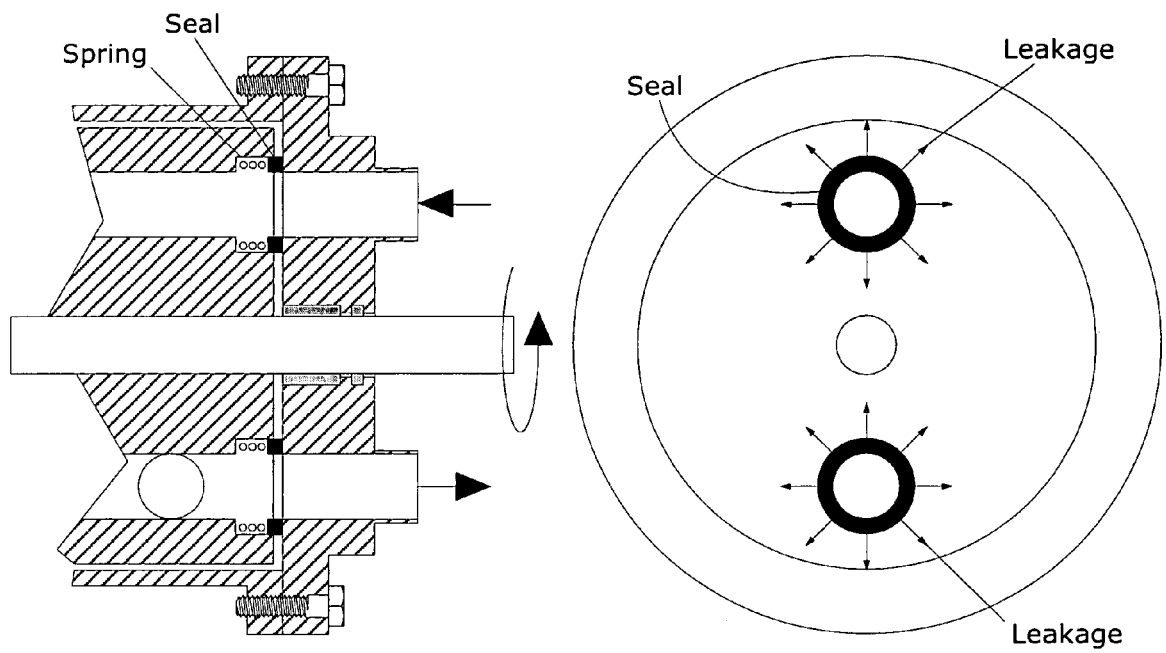
FIG. 3 is a cross-sectional view of the prior art.

Referring first to FIG. 2, which depicts a process flow diagram for a salt water filtration system 200 that uses a reverse osmosis process for the production of potable water which comprises a pressure exchange device 10 in accordance with the present invention.

A salt water reservoir 201 provides a supply of salt water which is pumped to a high pressure pump 204 by reservoir pump 202. Typically the reservoir pump 202 supplies salt water to both the high pressure pump 202 and the pressure exchange device 10 at approximately 30 psi pressure at approximately equal flow rates. The high pressure pump 204 boosts the pressure to approximately 1000 psi and supplies the salt water to a filter element 208. In this particular application, and not by way of limitation, the filter element 208 comprises a reverse osmosis type filter device which removes the impurities from the water and provides a fresh water supply 210. A pressure drop occurs in the filter element 208 such that a supply of waste water 209 exits the filter element 208 at approximately 980 psi. Rather than dump this waste water 209 at this elevated pressure, the waste water 209 is supplied to a high pressure inlet 104 of the pressure exchange device 10. This high pressure waste water is thus used to pressurize additional salt water for use in the filtration process. Reuse of this high pressure waste water 209 thus provides for a highly efficient filtration system 200.

As mentioned previously, the reservoir pump 202 supplies salt water to a low pressure inlet 100 of the pressure exchange device 10. The pressure exchange device 10, as to be discussed in more detail below, is configured to raise the pressure of the salt water supplied to it by the reservoir pump 202 to a pressure equal to the pressure of the waste water 209 supplied to the high pressure inlet 104.

A high pressure outlet 106 located on the pressure exchange device 10 is in fluid communication with a boost pump 214. The waste water 209 from the high pressure outlet 106 is supplied to the boost pump 214 for example at approximately 960 psi and the boost pump 214 raises the pressure to 1000 psi and supplies the waste water to the filter element 208 for further filtration. Thus, a closed loop system is provided that maximizes the use of the waste water and reuses the high pressure waste water to increase system efficiency.

Figure 1:
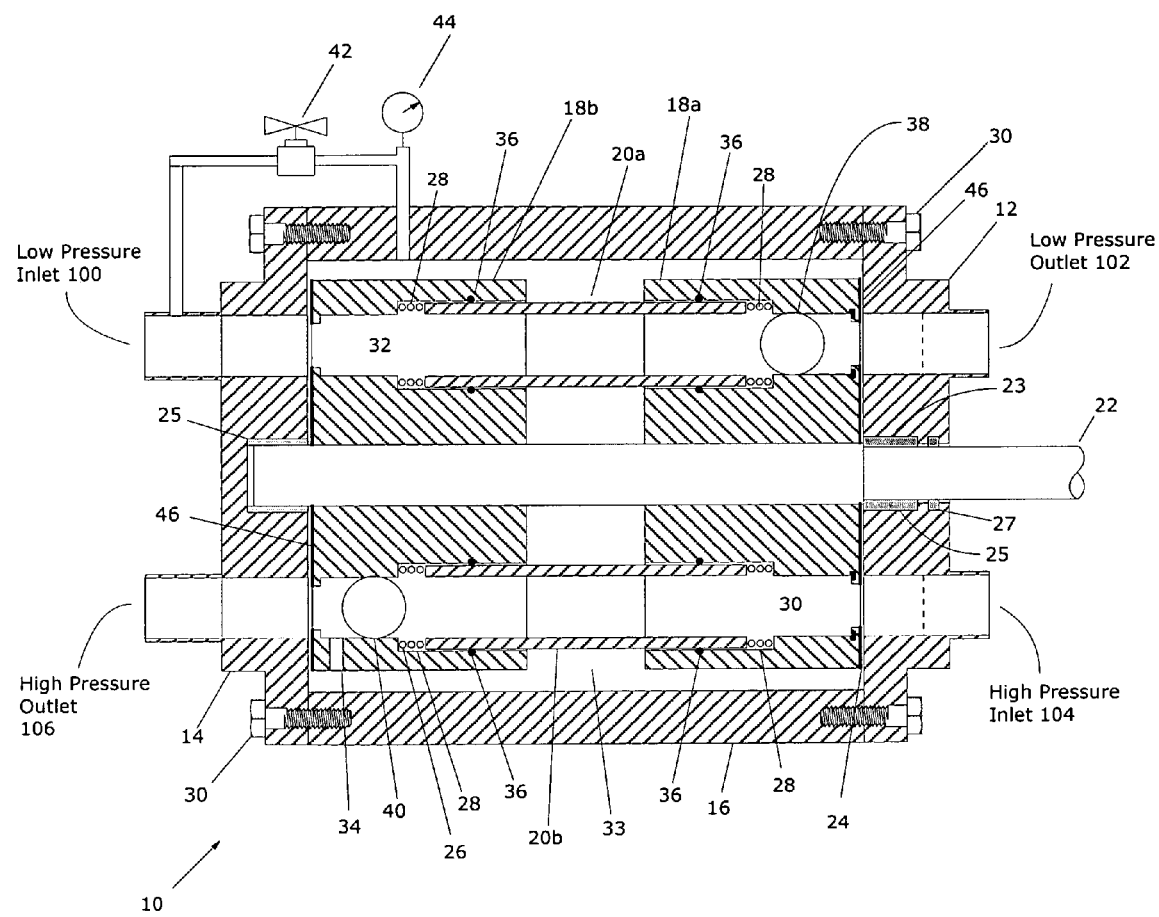
FIG. 1 is a cross-sectional side view of the pressure exchange device.

Referring to FIG. 1, the operation of the pressure exchange device 10 will now be discussed in more detail. The pressure exchange device 10 is comprised of a sealed housing 16 having a first and second end plate 12 and 14 respectively affixed thereon. Provided in the first end plate 12 is a low pressure outlet 102 and a high pressure inlet 104. Provided in the second end plate 14 is a high pressure outlet 106 and a low pressure inlet 100.

Referring back to FIG. 2, the low pressure outlet 102 is in fluid communication with a waste line 218 which is in fluid communication with a drain 220. The low pressure inlet 100 is in fluid communication with the reservoir pump 202 and the high pressure outlet 106 is in fluid communication with the boost pump 214. The high pressure inlet is in fluid communication with the filter element 208 and therefore receives the waste water 209 which is already at an elevated pressure.

Referring to FIG. 1, a left rotor 18a and a right rotor 18b is rotatably mounted inside the housing 16. Each rotor has at a minimum two opposing conduits. For ease of illustration in this sectional drawing these shall be referred to as a top conduit 32 and a bottom conduit 30. These conduits are held in coaxial alignment with each other. A top tube 20a and a bottom tube 20b is sealingly inserted in a respective conduit between the left and right rotor 18b and 18a to bridge the gap between the rotors and thereby provide for a continuous passageway from the right rotor 18a through the left rotor 18b. A seal 36 is provided at each end of the top and bottom tubes 20a and 20b to reduce fluid leakage. With this configuration, when the rotor is in proper alignment with the ports on the end plates 12 and 14, fluid may flow through the pressure exchange device 10.

A spring element 28 is disposed in a step 26 which is formed in the left and right rotor 18a and 18b. The spring element 28 is configured to act against the top and bottom tubes 20a and 20b and thereby provide a preload force to separate the left and right rotors 18b and 18a to minimize the gap 24 between a sealing surface 46 and the rotors. It should be noted that the gap 24 as shown in FIG. 1 is exaggerated for illustration purposes. Thanks in part to the spring element 28, the gap is actually very small, thereby reducing leakage during the initial start up phase. The sealing surface 46 is a hard coated surface provided on the inside wall of each end plate 12 and 14 to reduce leakage and wear that may occur from the rotors as they spin. The spring elements 28 therefore provide a preload between the sealing surfaces 28 primarily to reduce leakage at the initial start up of the pressure exchange device 10.

It should be understood that the location and configuration of the spring elements 28 may easily be modified as to location and type. For example, a single spring may be inserted between the left and right rotors 18a and 18b to provide the necessary sealing preload. All such modifications are fully contemplated by the present invention.

A shaft 22 is provided which runs coaxially through both the left and right rotor 18a and 18b. The shaft 22 is configured to provide the force to spin the rotors, but also allows for the left and right rotor to move along the longitudinal axis of the shaft 22 to maintain a proper sealing interface. This configuration may easily be accomplished by providing a spline or a keyway on the shaft 22 that allows the rotors to slide. The shaft 22 exits through a hole 23 in the first end plate 12 and is connected to a motive force such as a motor (not shown). A bearing 25 is provided in the first and second end plates 12 and 14 to support the shaft 22 and increase the overall system efficiency. An optional seal 27 reduces leakage to the environment between the housing end plate 12 and the shaft 22.

An optional first separator 38 and second separator 40 may be disposed in the respective top and bottom conduits 30 and 32. The separators 38 and 40 may be a sphere which is configured to translate back and forth in the respective conduit to aid in the pressure exchange process. The separators 38 and 40 may also be pistons with sealing elements disposed thereon.

A pressurized fluid 33 is provided internal to the housing 16 which acts to further separate the left and right rotor 18b and 18a and increase the sealing force acting on the sealing surface 46 and a respective face of the left and right rotors. The net sealing force is proportional to the difference in the pressurized fluid 33 acting to further separate left and right rotor 18b and 18a and the average force trying to close the left and right rotor 18b and 18a. Since the entire face of the rotor is subject to the pressurize fluid 33 while the sealing face 24 is subject to pressures that average lower than this pressure, there is a net force of separation of the rotors. This force is proportional to the difference in pressure between the pressurized fluid 33 pressure and the average face pressure 24. The pressurized fluid 33 may be supplied from the working fluid such as the salt water which is to be filtered, or it may be supplied by a unique fluid source such as a pressurized fluid reservoir.

An orifice 34 is provided between the rotor and the inside of the housing 16 such that pressurized fluid is allowed to enter from the bottom (high pressure) conduit 30 and provide a supply of fluid to help maintain and regulate the pressure of the pressurized fluid 33. It may also be advantageous to provide a bleed passage 42 which is in fluid communication with the pressurized fluid 33 and the low pressure inlet 100 to further regulate the pressure of the pressurized fluid 33. A pressure gage 44 may be located on the housing 16 which is configured to measure and indicate the pressure of the pressurized fluid 33. It would therefore be possible, through the use of dynamically controlled valves and pressure transducers, to provide a regulation system that produces a pressurized fluid that exhibits the optimum sealing force thus maintaining the pressure exchanger at peak efficiency.

Referring to FIGS. 1 and 2, and as previously described, the pressure exchange device 10 operates to transfer the high pressure contained in the waste water 209 (approx. 980 psi) to the low pressure (approx. 30 psi) salt water supplied to the low pressure inlet 100 by the reservoir pump 202. This is accomplished by spinning the left and right rotors 18a and 18b in unison such that the top conduit 32 and the bottom conduit 30 intermittently align with a respective inlet and outlet port of the pressure exchange device 10. A plurality of bores through the rotor is desirable in order to even out the flow through the pressure exchanger and increase throughput.

For example, with the rotors 18a and 18b in the position shown in FIG. 1, high pressure waste water is allowed to flow into the bottom conduit 30 through the high pressure inlet 104. This high pressure flow forces separator 34 to push fluid that is already contained in the bottom conduit 30 (from the previous cycle) out the high pressure outlet 106 at the elevated pressure. Thus the low pressure fluid contained in the bottom conduit 30 has now been elevated to the high pressure. At the same time, the top conduit 32 is in alignment with the low pressure inlet 100 and receives low pressure salt water from the reservoir pump 202. Since the low pressure outlet, as shown in FIG. 2 is attached to a drain (ie atmosphere), the flow of the low pressure fluid forces the separator 34 to the right and forces the fluid out of the bottom conduit 30 through the low pressure outlet 102 to a drain 220. It should be noted that the low pressure fluid that just flowed into the bottom conduit 32, will be the fluid that is pressurized to the higher pressure when the rotor spins 180 degrees and aligns with the high pressure inlet 104, thereby repeating the pressure transfer all over again. Obviously, a plurality of conduits, of varying cross-sectional shapes and sizes, can be formed in the rotors 18a and 18b to increase the flow rate and even out the flow of fluid through the pressure exchange device 10.

As the rotor assembly spins, the pressurized fluid 33 in the housing 16 acts against the rotor assembly to maintain a sealing pressure between the faces of the rotor assembly and the sealing surfaces 46. As the two sealing surfaces wear over time, the pressurized fluid 33 maintains the correct sealing pressure such that over time, the efficiency of the pressure exchanger 10 is not substantially degraded and repairs are not required for long periods of time.

It should be understood, of course, that the foregoing relates to preferred embodiments of the invention and that modifications may be made without departing from the spirit and scope of the invention as set forth in the following claims. For example, the fluid pressures discussed herein were used as for illustration purposes only and should not be used to limit the appended claims.

I claim:

1. A pressure exchange device for the transfer of a fluid comprising:
   a housing having a low pressure inlet located at a first distal end of said housing and a low pressure outlet located a second distal end of said housing, wherein said low pressure outlet is in alignment with said low pressure inlet, said housing further comprising a high pressure inlet located at said second distal end of said housing and a high pressure outlet located at said first distal end of said housing, wherein said high pressure inlet is in alignment with said high pressure outlet;
   a left rotor rotatably mounted inside said housing, said left rotor having a first low pressure conduit and a first high pressure conduit therethrough, said conduits configured to align with said high pressure outlet and said low pressure inlet concurrently as said left rotor rotates;
   a right rotor, coaxially aligned and offset from said left rotor, rotatably mounted inside said housing, said right rotor having a second low pressure conduit and a second high pressure conduit therethrough, said conduits being configured to align with said high pressure inlet and said low pressure outlet concurrently as said right rotor rotates;
   a first tube sealingly placed intermediate said left rotor and said right rotor configured to communicate fluid between said first low pressure conduit and said second low pressure conduit;
   a second tube, sealingly placed intermediate said left rotor and said right rotor configured to communicate fluid between said first high pressure conduit and said second high pressure conduit;
   a spring disposed between said left rotor and said right rotor, said spring configured to bias said left and right rotor apart from each other thereby maintaining light contact with said housing;
   a motive force configured to rotate said left rotor and said right rotor; and,
   a pressurized fluid internal to said housing, said pressurized fluid acting to maintain sealing contact between said left rotor and said right rotor and a respective sealing surface of said housing.

2. The pressure exchange device of claim 1, further comprising an orifice configured to communicate fluid between said first and second high pressure conduit to said pressurized fluid.

3. The pressure exchange device of claim 1, further comprising a valve configured to maintain a predetermined pressure of said pressurized fluid.

4. The pressure exchange device of claim 3, wherein said valve is dynamically controlled to dynamically control the sealing contact.

5. The pressure exchange device of claim 1, further comprising a shaft slidably affixed coaxially to said left and right rotor. Said shaft being configured to interface with said motive force and allow axial movement of said left and right rotor.

6. The pressure exchange device of claim 5, wherein said motive force is one selected from the group consisting of an electric motor, a diesel engine, a turbine, and a gas engine.

7. The pressure exchange device of claim 1, further comprising a pair of sealing elements in association with each said first and second tube, said sealing elements being configured to allow axial displacement of said left and right rotors.

8. The pressure exchange device of claim 7, wherein said sealing elements comprise an O-ring.

9. The pressure exchange device of claim 1, further comprising:
   a first separator movable inside said left and right rotors; and,
   a second separator movable inside said left and right rotors.

10. The pressure exchange device of claim 1, wherein the sealing effectiveness between said left rotor and said housing and said right rotor and said housing is capable of self adjustment.

11. The pressure exchange device of claim 1, wherein said left and right rotor may be rotated in either a clockwise or counterclockwise direction.

12. The pressure exchange device of claim 1, wherein said high pressure inlet and outlet may be interchanged with said low pressure inlet and outlet respectively.

13. A system for the filtration of contaminated water to produce potable water comprising:
   a low pressure pump configured to pump the contaminated water to a high pressure pump;
   a high pressure pump configured to receive contaminated water from said low pressure pump and communicate the contaminated water to a filtration device at an elevated pressure;
   said filtration device configured to produce potable water and waste water, said waste water being expelled at a relatively elevated pressure;
   a pressure exchange pump configured to receive said waste water from said filtration device and contaminated water from said low pressure pump, said pressure exchange pump further comprising:
   a housing having a low pressure inlet located at one distal end of said housing and a low pressure outlet located at the other distal end of said housing, wherein said low pressure outlet is in alignment with said low pressure inlet;
   a high pressure inlet located at one distal end of said housing and a high pressure outlet located at the other distal end of said housing, wherein said high pressure inlet is in alignment with said high pressure outlet;
   a left rotor rotatably mounted inside said housing, said left rotor having a first low pressure conduit and a first high pressure conduit therethrough, said conduits configured to align with said high pressure outlet and said low pressure inlet concurrently as said left rotor rotates;
   a right rotor, coaxially aligned and offset from said left rotor, rotatably mounted inside said housing, said right rotor having a second low pressure conduit and a second high pressure conduit therethrough, said conduits being configured to align with said high pressure inlet and said low pressure outlet concurrently as said right rotor rotates;
   a first tube sealingly placed intermediate said left rotor and said right rotor configured to communicate fluid between said first low pressure conduit and said second low pressure conduit;
   a second tube, sealingly placed intermediate said left rotor and said right rotor configured to communicate fluid between said first high pressure conduit and said second high pressure conduit;
   a pair of springs, each said spring abutting a respective said first tube and second tube, each spring configured to bias said left and right rotor to maintain light contact with said housing;
   a motive force configured to rotate said left rotor and said right rotor; and,
   a pressurized fluid internal to said housing, said pressurized fluid acting against said left and right rotor to maintain sealing contact with said housing.

14. The filtration system of claim 13, wherein said pressure exchange pump further comprises an orifice configured to communicate fluid between said first and second high pressure conduit to said pressurized fluid.

15. The filtration system of claim 13, wherein said pressure exchange pump further comprises a bleed valve configured to maintain a predetermined pressure of said pressurized fluid.

16. The filtration system of claim 13, wherein said pressure exchange pump further comprises a shaft slidably affixed coaxially to said left and right rotor and wherein said shaft is configured to interface with said motive force.

17. The filtration system of claim 16, wherein said motive force comprises an electric motor.

18. The filtration system of claim 13, wherein said pressure exchange pump further comprises a pair of sealing elements in association with each said first and second tube, said sealing elements being configured to allow movement of said first and second tubes.

19. The filtration system of claim 18, wherein said sealing element comprises an O-ring.

20. The filtration system of claim 13, wherein said pressure exchange pump further comprises:
   a first separator movable between said low pressure inlet and said low pressure outlet; and,
   a second separator movable between said high pressure inlet and said high pressure outlet.

21. A pressure exchange apparatus for transferring the energy of pressurization between two fluids, wherein one fluid is at a relatively higher pressure than the other, comprising:
   a first rotatably mounted rotor having a pair of spaced apart planar end faces, having at least one bore extending axially therethrough with each of said bores having an opening at each end thereof with said openings located in said planar end faces;
   a second rotatably mounted rotor being spaced apart from and coaxially aligned with said first rotor, said second rotor having a pair of spaced apart planar end faces, having at least one bore extending axially therethrough with each of said bores having an opening at each end thereof with said openings located in said planar end faces;
   a pair of closure plates rigidly affixed in close proximity to a respective said end face of said first rotor and said second rotor, and slidingly and sealingly engaging said respective end face, and each said closure plate having at least one fluid inlet passageway and at least one fluid discharge passageway, said passageways being positioned so that a fluid inlet passageway in one of said closure plates is aligned with said bore in said rotor at such time during the rotation of said rotor as a fluid discharge passageway in the other said closure plates is aligned with the same said bore;
   a pair of tubes slidably inserted axially between said first and second rotor in fluid communication with said bores such that fluid flows from a respective bore of said first rotor to a respective bore of said second rotor;
   a spring inserted between said first and second rotor configured to bias said first rotor apart from said second rotor;

a pressurized fluid acting upon a face of said first rotor and said second rotor to increase the sealing contact between said closure plates and said first and second rotors;

wherein said bore openings and said passageways being positioned in their respective surfaces so that during rotation of said rotors, said openings at the end of each bore are, in alternating sequence, brought into concurrent alignment with an inlet passageway at one end of the respective bore and a discharge passageway at the other end of the respective bore, and then, at a different time, into concurrent alignment with a discharge passageway at said one end of the respective bore and an inlet passageway opening at said other end of the respective bore, and a motive force for cyclically rotating said rotor relative to said closure plate so that each of said bore openings periodically moves through the same path to repeatedly effect said alternating sequence of alignment of said bores with said passageways.

22. The pressure exchange apparatus of claim 21 further comprising a valve configured to maintain a predetermined pressure of said pressurized fluid.

23. The pressure exchange device of claim 21, wherein said valve is dynamically controlled to dynamically control the sealing contact.

* * * * *